(12) United States Patent
Oda et al.

(10) Patent No.: US 8,017,722 B2
(45) Date of Patent: Sep. 13, 2011

(54) POLYCARBONATE CONTAINING PLANT-DERIVED COMPONENT AND PROCESS FOR THE PREPARATION THEREOF

(75) Inventors: Akimichi Oda, Iwakuni (JP); Eiichi Kitazono, Iwakuni (JP); Toshiyuki Miyake, Chiyoda-ku (JP); Masami Kinoshita, Chiyoda-ku (JP); Mizuho Saito, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/600,435

(22) PCT Filed: May 14, 2008

(86) PCT No.: PCT/JP2008/059296
§ 371 (c)(1),
(2), (4) Date: Nov. 16, 2009

(87) PCT Pub. No.: WO2008/143269
PCT Pub. Date: Nov. 27, 2008

(65) Prior Publication Data
US 2010/0160601 A1    Jun. 24, 2010

(30) Foreign Application Priority Data

| May 17, 2007 | (JP) | 2007-131701 |
| May 17, 2007 | (JP) | 2007-131702 |
| May 17, 2007 | (JP) | 2007-131703 |
| May 17, 2007 | (JP) | 2007-131704 |

(51) Int. Cl.
*C08G 64/00* (2006.01)
*C08G 63/02* (2006.01)

(52) U.S. Cl. ....... 528/406; 428/35.7; 527/300; 527/310; 528/370

(58) Field of Classification Search .......... 428/35.7; 527/300, 310; 528/370, 406
See application file for complete search history.

(56) References Cited

U.S. PATENT DOCUMENTS

| 4,506,066 A | 3/1985 | Medem et al. |
| 5,142,018 A | 8/1992 | Sakashita et al. |
| 6,265,523 B1 | 7/2001 | Nagai et al. |
| 6,410,678 B1 | 6/2002 | Ishida et al. |
| 7,365,148 B2 | 4/2008 | Ono et al. |
| 2005/0143554 A1 | 6/2005 | Shara et al. |
| 2006/0149024 A1 | 7/2006 | Ono et al. |
| 2009/0270586 A1 * | 10/2009 | Kitazono et al. ............. 528/370 |

FOREIGN PATENT DOCUMENTS

| EP | 2 060 595 A1 | 5/2009 |
| GB | 1079686 A | 8/1967 |
| JP | 11-349678 A | 12/1999 |
| JP | 2000-007777 A | 1/2000 |
| JP | 2000-095855 A | 4/2000 |
| JP | 2001-270938 A | 10/2001 |
| JP | 2002-308981 A | 10/2002 |
| JP | 2003292603 A | 10/2003 |
| WO | 2004111106 A1 | 12/2004 |
| WO | 2007/013463 A1 | 2/2007 |
| WO | 2007/148604 A1 | 12/2007 |
| WO | 2008/029746 A1 | 3/2008 |

* cited by examiner

*Primary Examiner* — Terressa M Boykin
(74) *Attorney, Agent, or Firm* — Sughrue Mion, PLLC

(57) ABSTRACT

A process for production of a plant-derived component-containing polycarbonate represented by the following formula (3):

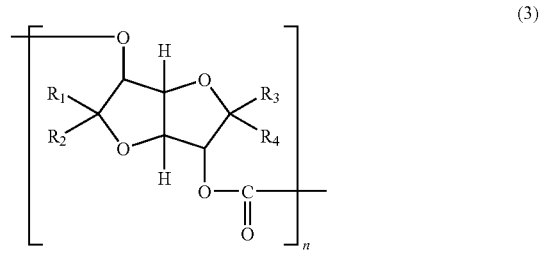

(wherein $R_1$-$R_4$ each independently represent a group selected from among hydrogen, alkyl, cycloalkyl and aryl, and n is the number of repeating units), by melt polycondensation using as the starting materials a specified diol, having a total content of Na, Fe and Ca of no greater than 2 ppm and a purity analysis value of at least 99.7% by gas chromatography, and a specified carbonic acid diester, having a total content of Na, Fe and Ca of no greater than 2 ppm and a purity analysis value of at least 99.7% by gas chromatography.

8 Claims, No Drawings

POLYCARBONATE CONTAINING PLANT-DERIVED COMPONENT AND PROCESS FOR THE PREPARATION THEREOF

CROSS REFERENCE TO RELATED APPLICATION

This application is a National Stage of International Application No. PCT/JP2008/059296 filed May 14, 2008.

TECHNICAL FIELD

The present invention relates to a process for production of polycarbonates containing plant-derived components and having specific physical properties, as well as to polycarbonates produced by the process and to moldings comprising the polycarbonates.

BACKGROUND ART

Polycarbonate resins are widely used in optical media fields, electrical, electronic and OA fields, automobile fields, industrial machinery fields, medical treatment fields and other industrial fields because of their excellent transparency, heat resistance and impact resistance. However, the aromatic polycarbonates currently in wide use are produced using starting materials obtained from petroleum resources. In light of modern concerns over depletion of petroleum resources and global warming due to carbon dioxide generated by thermal disposal of waste, more environmentally friendly materials with properties similar to aromatic polycarbonates are desired.

In this context, since anhydrosugar alcohols such as dianhydrohexitols (isomannide, isoidide and isosorbide) can be obtained from the plant-derived starting materials mannitol, iditol and sorbitol, these are being investigated as renewable sources for production of polymers and especially polyesters and polycarbonates (resources that, unlike depletable natural resources such as petroleum or coal, are themselves renewable: e.g., forest resources, biomass, wind power, small-scale water power and the like). Of these, low-cost starch has been produced as a starting material and used even as a starting material for drugs, while polymers employing isosorbide that is commercially available are also being actively investigated (for example, see Patent documents 1-5).

However no production process is known for polymers, and especially polycarbonates, obtained using such anhydrosugar alcohols as starting materials, that also allows control of the physical properties including the amount of production of polymer end groups with specific structures.

[Patent document 1] UK Patent No. GB 1079686
[Patent document 2] U.S. Pat. No. 4,506,066
[Patent document 3] International Patent Publication No. WO2007/013463
[Patent document 4] International Patent Publication No. WO2004/111106
[Patent document 5] Japanese Unexamined Patent Publication No. 2003-292603

DISCLOSURE OF THE INVENTION

Problems to be Solved by the Invention

It is an object of the present invention to provide a process for production of polycarbonates containing plant-derived components, as well as polycarbonates exhibiting specific physical properties and excellent color tone and mechanical properties, which are obtained by the production process, and moldings composed of the same.

Means for Solving the Problems

As a result of much diligent research directed toward achieving the object stated above, the present inventors have completed this invention which is a process for production of a plant-derived component-containing polycarbonate using a polymer starting material with a total Na, Ca and Fe content of no greater than a specified amount. The construction of the invention is as follows.

1. A process for production of a plant-derived component-containing polycarbonate represented by the following formula (3):

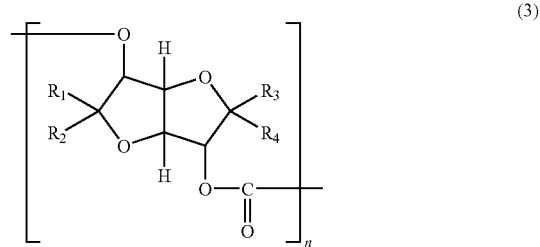

(wherein $R_1$-$R_4$ each independently represent a group selected from among hydrogen, alkyl, cycloalkyl and aryl, and n is the number of repeating units), by melt polycondensation using as the starting materials a diol represented by the following formula (1), having a total content of Na, Fe and Ca of no greater than 2 ppm and a purity analysis value of at least 99.7% by gas chromatography:

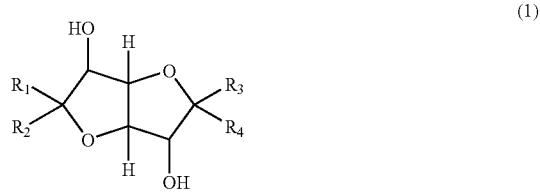

(wherein $R_1$-$R_4$ each independently represent a group selected from among hydrogen, alkyl, cycloalkyl and aryl), and a carbonic acid diester represented by the following formula (2), having a total content of Na, Fe and Ca of no greater than 2 ppm and a purity analysis value of at least 99.7% by gas chromatography:

(wherein $R_5$ and $R_6$ are groups selected from among alkyl, cycloalkyl and aryl, and $R_5$ and $R_6$ may be the same or different groups).

2. A polycarbonate obtained by the production process of 1. above, characterized in that the molar ratio between the total of ends having a structure represented by the following formula (4) and ends having a structure represented by the following formula (5) in the polymer, and diol residues represented by the following formula (6) in the polymer, is $1 \times 10^{-4}$-0.1.

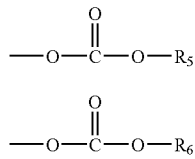 (4)

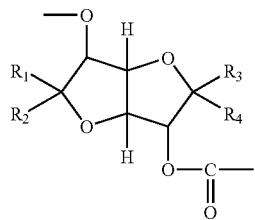 (5)

($R_5$ in formula (4) and $R_6$ in formula (5) have the same definitions as in formula (2) of 1. above.)

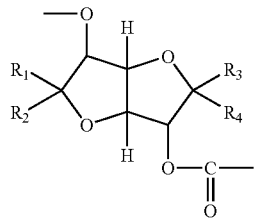 (6)

($R_1$, $R_2$, $R_3$ and $R_4$ in formula (6) have the same definitions as in formula (1) of 1. above.)

3. A polycarbonate obtained by the production process of 1. above, characterized in that the molar ratio between the total of ends having a structure represented by the following formula (7) and ends having a structure represented by the following formula (8) in the polymer, and diol residues represented by the following formula (9) in the polymer, is no greater than $1 \times 10^{-4}$.

 (7)

 (8)

($R_5$ in formula (7) and $R_6$ in formula (8) have the same definitions as in formula (2) of 1. above.)

(9)

($R_1$, $R_2$, $R_3$ and $R_4$ in formula (9) have the same definitions as in formula (1) of 1. above.)

4. A polycarbonate obtained by the production process of 1. above, characterized in that the mean square radius of gyration is 5 nm or greater.

5. A polycarbonate obtained by the production process of 1. above, wherein the content of Na, Fe and Ca in the polymer is no greater than 10 ppm.

6. A polycarbonate obtained by the production process of 1. above, wherein the Col-b value of the polymer is no greater than 5.

7. A molding comprising a polycarbonate according to any one of 2. to 6. above.

Effect of the Invention

According to the invention there is provided a process for production of plant-derived component-containing polycarbonates, polycarbonates obtained by the production process and moldings of the polycarbonates.

The process for production of polycarbonates according to the invention can produce environmentally friendly polycarbonates that are composed of plant-derived components, a renewable source, and are highly useful for a variety of purposes.

BEST MODE FOR CARRYING OUT THE INVENTION

The present invention will now be explained in greater detail.

In the production process of the invention, a polycarbonate of formula (3) above is produced by a melt polycondensation process from a diol represented by formula (1) above and a carbonic acid diester represented by formula (2) above.

The plant-derived diol used for the invention is represented by formula (1) above, and specifically it is a dianhydrohexitol. As dianhydrohexitols there may be mentioned 1,4:3,6-dianhydro-D-mannitol (also referred to as "isomannide" throughout the present specification), 1,4:3,6-dianhydro-L-iditol (also referred to as "isoidide" throughout the present specification) and 1,4:3,6-dianhydro-D-sorbitol (also referred to as "isosorbide" throughout the present specification) (represented by the following formulas (10), (11) and (12), respectively). These dianhydrohexitols are substances obtained from natural biomass, and are renewable sources. Isosorbide can be obtained by adding water to D-glucose from starch and then subjecting it to dehydration. Other dianhydrohexitols can also be obtained by similar reactions with different starting materials. Isosorbide is a diol that is easily produced from starch, an abundantly available source, while it is easier to produce than isomannide or isoidide.

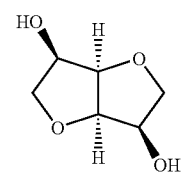 (10)

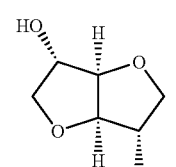 (11)

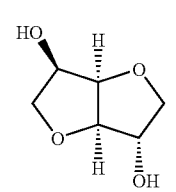 (12)

There are no particular restrictions on the method of purifying the diols used for the invention. Simple distillation, rectification or recrystallization is preferred, or a combination of these methods may be employed for purification. However, commercial diol products often contain stabilizers or degradation products from storage, and these can adversely affect polymer quality. Allowing the stabilizer-free diol to stand in an air will promote formic acid-generating decomposition reaction. When a diol that has undergone such decomposition reaction is used for polycondensation reaction, the reaction rate is notably reduced and the polymer color tone is impaired. Therefore, when such diols are used to obtain polymers, it is preferred for them to be re-purified and immediately used for polycondensation reaction. However, when such a diol must nevertheless be used after being provisionally stored for a period after purification, it is preferably stored dry at a low temperature of 40° C. or below and shaded under an inert atmosphere, and it is especially important for it to be stored dry under an inert atmosphere.

As a method for judging whether or not the diol has undergone the aforementioned decomposition reaction and is unsuitable as a polymer starting material, there may be mentioned a method of preparing an aqueous solution of the diol and confirming its pH. Specifically, a diol whose 40 wt % aqueous solution has a pH of 5 or greater will not undergo significant decomposition and is suitable as a polymer starting material, while a pH of 6 or greater is more preferable. If polycondensation reaction is carried out using a diol whose 40 wt % aqueous solution has a pH of lower than 5, the reaction rate will be notably reduced as mentioned above and it will become difficult to obtain a polymer with a sufficient polymerization degree, while the color tone of the polymer may also be impaired.

The diol component of formula (1) used for the invention has an organic impurity content of no greater than 0.3%, preferably no greater than 0.1% and even more preferably no greater than 0.05% of the total, as detected by gas chromatography. According to the invention, the percentage unit for the organic impurity content as detected by gas chromatography is mole percent. The diol component of formula (1) used for the invention also has a total content of Na, Fe and Ca of no greater than 2 ppm and preferably no greater than 1 ppm. According to the invention, the ppm unit for the total Na, Fe and Ca content is ppm by weight.

In the production process of the invention, diols other than those represented by formula (1) above such as glycols, or hydroxycarboxylic acids such as lactic acid or polycarboxylic acids may also be used for co-polycondensation, in which case the molar ratio of such copolymerizing components and the diol component of formula (1) is preferably smaller than 2/98 in order to avoid interfering with the physical properties required for the polymer.

As carbonic acid diesters to be used for the invention there may be mentioned the ones represented by formula (2) above, including aromatic carbonic acid diesters such as diphenyl carbonate, ditolyl carbonate, dixylyl carbonate, bis(ethylphenyl)carbonate, bis(methoxyphenyl)carbonate, bis(ethoxyphenyl)carbonate, dinaphthyl carbonate and bis(biphenyl) carbonate, and aliphatic carbonic acid diesters such as dimethyl carbonate, diethyl carbonate and dibutyl carbonate. Aromatic carbonic acid diesters are preferred among such compounds from the viewpoint of reactivity and cost, with C13-25 aromatic carbonic acid diesters being particularly preferred and diphenyl carbonate being most especially preferred.

There are no particular restrictions on the method of purifying the carbonic acid diester used for the invention. Simple distillation, rectification or recrystallization is preferred, or a combination of these methods may be employed for purification.

The carbonic acid diester used for the invention has an organic impurity content of no greater than 0.3%, preferably no greater than 0.1% and even more preferably no greater than 0.05% of the total, as detected by gas chromatography. The carbonic acid diester of formula (2) used for the invention also has a total content of Na, Fe and Ca of no greater than 2 ppm and preferably no greater than 1 ppm.

As publicly known processes for production of polycarbonate resins there may be mentioned the phosgene process wherein essentially an alkaline aqueous solution of a dihydroxy compound is reacted with phosgene in the presence of an organic solvent, or a melt polycondensation process wherein a dihydroxy compound and a carbonic acid diester are subjected to melt polycondensation reaction at high temperature and high vacuum in the presence of a transesterification catalyst. Of these, the melt polycondensation process requires a transesterification catalyst as well as high temperature and high vacuum but is more economical than the phosgene process, while it is also advantageous in that polycarbonate resins with substantially no chlorine can be obtained. According to the invention, the polycarbonate is produced by a melt polycondensation process.

For the melt polymerization conducted to obtain a polycarbonate of the invention, preferably the carbonic acid diester is used in an amount of 0.90-1.30 mol and more preferably 0.99-1.05 mol with respect to 1 mol of the diol component.

A catalyst is preferably used for the production process of the invention. As suitable catalysts there may be mentioned compounds with the ability to catalyze transesterification or esterification reaction, such as alkoxides or phenoxides of alkali metals, alkoxides or phenoxides of alkaline earth metals, nitrogen-containing basic compounds, quaternary ammonium salts, organic acid salts of alkali metals or alkaline earth metals, boron compounds, aluminum compounds, zinc compounds, boron compounds, silicon compounds, titanium compounds, organic tin compounds, lead compounds, osmium compounds, antimony compounds, zirconium compounds, manganese compound and the like, and from the viewpoint of reactivity, effects on molding quality, cost and health it is preferred to use (i) nitrogen-containing basic compounds, (ii) alkali metal compounds and (iii) alkaline earth metal compounds. These may be used alone or two or more may be used in combinations, among which combinations of (i) and (ii), (i) and (iii) and (i), (ii) and (iii) are particularly preferred.

Tetramethylammonium hydroxide is preferred for (i), and sodium salts are preferred for (ii), with 2,2-bis(4-hydroxyphenyl)propane disodium salt being especially preferred.

The nitrogen basic compound of (i) above is used in an amount for a proportion of basic nitrogen atoms of preferably $1 \times 10^{-6} - 1 \times 10^{-3}$ mol and more preferably $2 \times 10^{-5} - 8 \times 10^{-4}$ mol with respect to 1 mol of the diol compound.

For the (ii) alkali metal compound and (iii) alkaline earth metal compound as catalysts, the total of alkali metal elements and alkaline earth metal elements added is preferably in the range of 0 to $1 \times 10^{-5}$ mol and more preferably in the range of $0-5 \times 10^{-6}$ mol per mole of the starting diol compounds.

In the production process of the invention, preferably the diol and carbonic acid diester starting materials are heated at ordinary pressure in the presence of a polycondensation catalyst for pre-reaction, after which they are stirred while heating at a temperature of no higher than 280° C. under reduced pressure to run off the phenols and alcohols. The reaction system is preferably kept in an atmosphere of a gas that is inert to the starting materials and reaction mixture, such as nitrogen. Argon may be mentioned as an inert gas other than nitrogen.

Thermal reaction is preferably conducted at ordinary pressure at the initial stage. This will promote the oligomerization reaction and, during the reduced pressure in the later stage for run off of the phenols and alcohols, will prevent run off of the unreacted monomer that results in molar imbalance and a reduced polymerization degree. In the production process of the invention, appropriate removal of the phenols and alcohols from the system (the reactor) can help promote the reaction. Reduced pressure is therefore effective, and is preferred.

For the production process of the invention, a minimally low temperature condition is preferred to inhibit diol decomposition and obtain a resin with low coloration and high viscosity, but to suitably promote the polycondensation reaction, the conditions should be such that the maximum polycondensation temperature is in the range of preferably between 180° C. and 280° C. and more preferably 230-260° C.

In the polycarbonate of the invention, the molar ratio between the total of ends with a structure represented by formula (4) above and ends with a structure represented by formula (5) above in the polymer, and the diol residue represented by formula (6) above in the polymer, is preferably $1 \times 10^{-4}$-0.1. A smaller molar ratio is not preferred as it may result in considerable coloration of the polymer. A molar ratio which is larger than this range corresponds to a lower polymerization degree of the polymer, and is not preferred because the mechanical strength will no longer be in a range that can withstand practical use. A more preferred molar ratio (also referred to as the carbonate end group yield) is $3 \times 10^{-4}$-$5.0 \times 10^{-2}$. In order to control the carbonate end group yield to the desired value, it is important for the organic impurity content and Na, Fe and Ca content of the diol component and carbonic acid diester starting materials to be no greater than the aforementioned specified values.

As compounds with ends having the structure represented by formula (4) above and ends having the structure represented by formula (5) above, there are preferred compounds wherein $R_5$ and $R_6$ are C6-12 aromatic groups, and especially compounds wherein $R_5$ and $R_6$ are both phenyl groups.

In the polycarbonate of the invention, the molar ratio between the total of ends with a structure represented by formula (7) above and ends with a structure represented by formula (8) above in the polymer, and the diol residue represented by formula (9) above in the polymer, is preferably no greater than $1 \times 10^{-4}$. A larger molar ratio is not preferred as it may result in considerable coloration of the polymer. A more preferred molar ratio (also referred to as the ether end group yield) is no greater than $1 \times 10^{-5}$. In order to control the ether end group yield to the desired value, it is important for the organic impurity content and Na, Fe and Ca content of the diol component and carbonic acid diester starting materials to be no greater than the aforementioned specified values.

As compounds with ends having the structure represented by formula (7) above and ends having the structure represented by formula (8) above, there are preferred compounds wherein $R_5$ and $R_6$ are C6-12 aromatic groups, and especially compounds wherein $R_5$ and $R_6$ are both phenyl groups. The ends having the structures represented by formulas (7) and (8) above are equivalent to the ether end groups, i.e. the ends having the following formulas (13) and (14) upon etherification of the diol of formula (1) above, and they do not include carbonate end groups of formula (4) and formula (5) above.

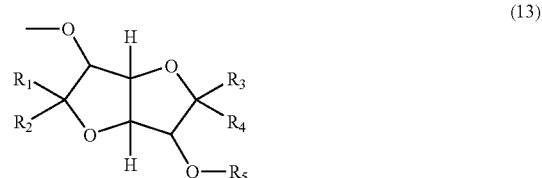

(13)

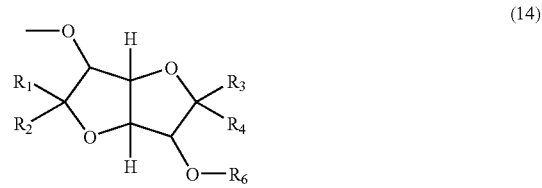

(14)

($R_1$, $R_2$, $R_3$ and $R_4$ in formulas (13) and (14) have the same definitions as in formula (1) above, and $R_5$ and $R_6$ have the same definitions as in formula (2) above.)

The polycarbonate of the invention preferably has a mean square radius of gyration of 5 nm or greater, and the polymer preferably has a sufficiently low extent of branching. The mean square radius of gyration and the extent of branching of the polymer are correlated, with a lower extent of branching being associated with a greater mean square radius of gyration of the polymer. A mean square radius of gyration of 5 nm or greater is advantageous in that the polycarbonate of the invention will be more resistant to reduction in tensile and flexural strength and impact resistance, as well as roughening of the surface, when it is molded into a molding. In order to obtain the desired value for the mean square radius of gyration, it is important for the organic impurity content and Na, Fe and Ca content of the diol component and carbonic acid diester starting materials to be no greater than the aforementioned specified values.

The polycarbonate of the invention is represented by formula (3) above, and the total content of Na, Ca and Fe in the polymer is no greater than 10 ppm, more preferably no greater than 7 ppm and most preferably no greater than 3 ppm. The inorganic impurity content is preferably not above this range, because coloration will become notable and the molten stability and hydrolysis resistance will be impaired. The Na, Ca and Fe may be contained in a commercial diol of formula (1) above, or they may be obtained from contaminating impurities from materials or external air of production facilities and the like.

Methods for limiting the total content of Na, Ca and Fe of the polymer to the range specified above include using starting materials with low contents of these metals, limiting the amount of catalyst used, and carrying out production with equipment made of materials that are resistant to elution of such metals. Although a smaller total content of Na, Ca and Fe in the polymer is preferred, attempts to achieve a content of 0 ppm may greatly increase cost for impurity contaminant reduction and may lower production efficiency. The lower limit for the total Na, Ca and Fe content in the polymer that can be achieved while maintaining productivity is about 3 ppm.

According to the invention, the total Na, Ca and Fe content is preferably determined using an ICP (Inductively Coupled Plasma) emission analyzer. An ICP emission analyzer is used to perform emission spectroscopic analysis using high-frequency inductively coupled plasma as the excitation source, whereby upon introduction of an atomized sample solution into high temperature argon plasma and analysis of the emission spectrum lines with a diffraction grating it allows qualitative and quantitative analysis of elements based on wavelength and intensity of the spectral lines, and it is especially suitable for simultaneous multi-element analysis while being more efficient than quantitation by absorption spectrophotometry.

The polycarbonate of the invention has a 20° C. relative viscosity, for a solution of 0.7 g of the polycarbonate dissolved in 100 ml of methylene chloride, which is minimally 0.20 and preferably 0.22 or greater, and maximally 0.45, preferably no greater than 0.37 and more preferably no greater than 0.34. A relative viscosity of lower than 0.20 may result in insufficient mechanical strength of molded articles obtained from the polycarbonate of the invention. A relative viscosity of higher than 0.45 will tend to result in an excessively high melt flow property, such that the melting temperature at which the flow property necessary for molding is exhibited will be higher than the decomposition temperature. The number of repeating units n in formula (3) above, which represents the polycarbonate of the invention, is the mean polymerization degree corresponding to a relative viscosity in the range specified above.

The polycarbonate of the invention is a polycarbonate with a Col-b value of no greater than 5 and preferably no greater than 3.

The polycarbonate of the invention can be used for a wide variety of purposes including optical media, electrical, electronic and OA devices, automobiles and industrial machinery, medical and safety equipment, sheets, films, packagings and general merchandise. Specifically, there may be mentioned optical media such as DVD, CD-ROM, CD-R and minidisks, electrical, electronic and OA devices such as cellular phones, personal computer housings, battery pack cases, liquid crystal parts and connectors, automobile and industrial machinery parts such as headlamps, inner lenses, door handles, bumpers, fenders, roof rails, instrument panels, clusters, console boxes, cameras and power tools, medical and safety equipment such as name plates, carports, liquid crystal diffusion/reflective films and potable water tanks, and general merchandise such as pachinko parts, fire extinguisher cases and the like.

The method for molding the polycarbonate to obtain moldings for the purposes mentioned above according to the invention may be injection molding, compression molding, injection compression molding, extrusion molding, blow molding or the like. The method of producing a film or sheet may be, for example, solvent casting, melt extrusion, calendering or the like.

EXAMPLES

The present invention will now be explained in greater detail by examples, with the understanding that the invention is in no way restricted by the examples.

The isosorbide used in the examples was a product by Roquette, the diphenyl carbonate was a product by Teijin Chemicals, Ltd. and the methylene chloride was a product by Wako Pure Chemical Industries, Ltd. The desiccant used for storage of the distillation-purified isosorbide was AZ-10G zeolite desiccant by As One Corp., and the deoxidizer was A500 HS oxygen absorbent, also by As One Corp.

(1) The amounts of isosorbide, diphenyl carbonate and polymer inorganic impurities were quantified using a VISTA MP-X ICP emission analyzer (multi-type) (Varian, Japan), following ordinary protocols.

(2) The purities of the isosorbide and diphenyl carbonate were measured using a gas chromatograph (GC-14B by Shimadzu Corp.). As the measuring conditions there were employed a column temperature of 220° C., an injection temperature of 280° C., a detection temperature of 280° C., carrier gas: (He: 120 kPa (1.63 ml/min), Split: 30.9 ml/min, PURGE: 30 ml/min), make up: ($N_2$: 40 ml/min, $H_2 \times$Air: 70×70 kPa). A sample solution (5% acetone solution) was prepared and 1 μl was injected for measurement.

(3) The pH of the isosorbide aqueous solution was measured with a 40 wt % isosorbide aqueous solution sample, using a B-212 pH Meter by Horiba, Ltd.

(4) The molar ratio of polycarbonate phenyl carbonate ends and isosorbide residues was measured using a Fourier Transform Nuclear Magnetic Resonance apparatus (JNM-EX270 FT-NMR by JEOL), with calculation from the integrated intensity of the peaks attributed to isosorbide appearing at a chemical shift of 3.7-5.3 ppm, and the peaks attributed to diphenyl carbonate ends appearing at 7.1-7.5 ppm.

(5) The molar ratio of polycarbonate phenyl ether ends and isosorbide residues was measured using a nuclear magnetic resonance apparatus at 600 MHz after dissolution of the polymer in heavy methylene chloride, with calculation from the integrated intensity of the peaks attributed to isosorbide appearing at a chemical shift of 3.7-5.3 ppm, and the peaks attributed to phenyl ether ends appearing at 6.8-7.4 ppm.

(6) The mean square radius of gyration for the polycarbonate was measured using a DAWN HELEOS multi-angle light scattering detector (MALS) after separating the sample by size exclusion chromatography (SEC).

(7) The relative viscosity of the polycarbonate was measured as the 20° C. viscosity of a solution of 0.7 g of polycarbonate sample dissolved in 100 ml of methylene chloride.

(8) The color tone of the polycarbonate was determined by measuring the Col-b value using a UV-VIS Recording Spectrophotometer (product of Shimadzu Corp.), according to JIS Z 8722. The measurement was preferred by adding 4 ml of methylene chloride to 0.935 g of polycarbonate sample for dissolution and measuring the Col-b value under conditions with a wavelength of 780-380 nm, an illumination of C and a visual field of 2°.

(9) For the molding evaluation, an injection molding machine (PS-type injection molding machine, PS20 by Nissei Plastic Industrial Co., Ltd.) was used for molding of a test strip with 3 mm thickness×12.5 mm width×63 mm length at a cylinder temperature of 250° C. and a mold temperature of 80° C., and the outer appearance thereof was visually confirmed.

Example 1

After placing 87.68 g (0.6 mol) of isosorbide, exhibiting an aqueous solution pH of 8 after being stored at room temperature (10-35° C.) together with a desiccant and deoxidizer subsequent to a single simple distillation, and 128.53 g (0.6 mol) of diphenyl carbonate in a three-necked flask, 2,2-bis(4-hydroxyphenyl)propane disodium salt (0.04 mg, $1.5 \times 10^{-7}$ mol) and 25 wt % aqueous tetramethylammonium hydroxide (21.9 mg, $6.0 \times 10^{-5}$ mol) were added as polycondensation catalysts and the mixture was melted at 180° C. under a nitrogen atmosphere. The reaction tank interior was then reduced in pressure to 100 mmHg (13.33 kPa) while stirring, and reaction was conducted for approximately 20 minutes while distilling off the produced phenol. After then increasing the temperature to 200° C., the pressure was reduced to 30 mmHg (4.00 kPa) while distilling off the phenol, and the temperature was further raised to 250° C. With subsequent gradual pressure reduction, reaction was continued for 10 minutes at 20 mmHg (2.67 kPa) and for 10 minutes at 10 mmHg (1.33 kPa), and after raising the temperature to 260° C. and further pressure reduction and temperature increase, the reaction was continued under final conditions of 270° C., 0.5 mmHg (0.067 kPa). This point was defined as 0 minutes, and after 60 minutes a sample was taken and the analyses, measurements and evaluations were performed. The results are shown in Table 1.

Example 2

The procedure was conducted under the same conditions as in Example 1, except that the total content of Na, Fe and Ca in the isosorbide was 0.6 ppm. The results are shown in Table 1.

Example 3

The procedure was conducted under the same conditions as in Example 1, except that the total content of Na, Fe and Ca in the isosorbide was 0.7 ppm. The results are shown in Table 1.

Example 4

The procedure was conducted under the same conditions as in Example 1, except that the total content of Na, Fe and Ca in the isosorbide was 0.8 ppm. The results are shown in Table 1.

Comparative Example 1

The same procedure was conducted as in Example 1, except that a commercial isosorbide product with a total content of Na, Fe and Ca of 20 ppm was used without distilling purification. The results are shown in Table 1.

Comparative Example 2

The same procedure was conducted as in Example 1, except that a commercial isosorbide product with a total content of Na, Fe and Ca of 22.3 ppm was used without distilling purification. The results are shown in Table 1.

| | Isosorbide | | Diphenyl carbonate | | Physical properties of Polymer (polycarbonate) | | | | | | |
|---|---|---|---|---|---|---|---|---|---|---|---|
| | | | | | Phenyl carbonate | Phenyl ether | | | | | |
| | Na, Fe, Ca total content[1] (ppm wt.) | Purity[2] (mol %) | Na, Fe, Ca total content (ppm wt.) | Purity (mol %) | end/ isosorbide residue (molar ratio) | end/ isosorbide residue (molar ratio) | Mean square radius of gyration (nm) | Na, Fe, Ca total content (ppm wt.) | Specific viscosity (—) | Color tone (Col-b) | Molded article Appearance (visual) |
| Example 1 | 0.3 | 99.9 | 0.4 | 99.9 | $9.2 \times 10^{-3}$ | 0 | — | 6.7 | 0.25 | 1.9 | Good |
| Example 2 | 0.6 | 99.9 | 0.4 | 99.9 | $1.8 \times 10^{-2}$ | — | — | 1.7 | 0.30 | 0.5 | Good |
| Example 3 | 0.7 | 99.9 | 0.4 | 99.9 | — | — | 8 | — | 0.31 | — | Good |
| Example 4 | 0.8 | 99.9 | 0.4 | 99.9 | — | — | — | 8.0 | 0.28 | 3.0 | Good |
| Comp. Ex. 1 | 20 | 99.9 | 0.4 | | $6.4 \times 10^{-5}$ | — | 4 | 16.7 | 0.31 | 8.9 | Yellowing |
| Comp. Ex. 2 | 22.3 | 99.9 | 0.4 | 99.9 | — | $1.2 \times 10^{-4}$ | | 18.2 | 0.30 | 9.7 | Yellowing |

[1] The inorganic impurity contents are the values measured by ICP emission spectroscopy.

[2] The purities were measured by gas chromatography.

What we claim is:

1. A plant-derived component-containing polycarbonate represented by the following formula (3):

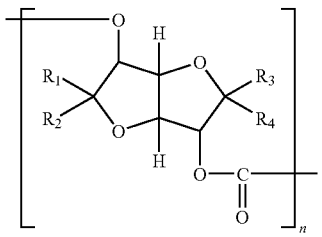
(3)

wherein $R_1$-$R_4$ each independently represent a group selected from among hydrogen, alkyl, cycloalkyl and aryl, and n is the number of repeating units, produced by a process of melt polycondensation using as the starting materials a diol represented by the following formula (1), having a total content of Na, Fe and Ca of no greater than 2 ppm and a purity analysis value of at least 99.7% by gas chromatography:

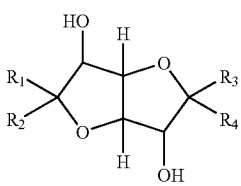
(1)

wherein $R_1$-$R_4$ each independently represent a group selected from among hydrogen, alkyl, cycloalkyl and aryl, and a carbonic acid diester represented by the following formula (2), having a total content of Na, Fe and Ca of no greater than 2 ppm and a purity analysis value of at least 99.7% by gas chromatography:

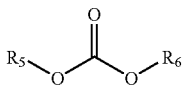
(2)

wherein $R_5$ and $R_6$ are groups selected from among alkyl, cycloalkyl and aryl, and $R_5$ and $R_6$ may be the same or different groups,
   wherein the polycarbonate satisfies at least one of the following (A) and (B):
   (A) the molar ratio between the total of ends having a structure represented by the following formula (4) and ends having a structure represented by the following formula (5) in the polymer, and diol residues represented by the following formula (6) in the polymer, is $1 \times 10^{-4}$ to 0.1:

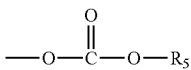
(4)

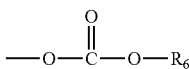
(5)

$R_5$ in formula (4) and $R_6$ in formula (5) have the same definitions as in formula (2);

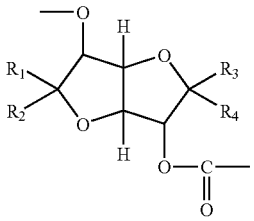
(6)

$R_1$, $R_2$, $R_3$ and $R_4$ in formula (6) have the same definitions as in formula (1);
   (B) the molar ratio between the total of ends having a structure represented by the following formula (7) and ends having a structure represented by the following formula (8) in the polymer, and diol residues represented by the following formula (9) in the polymer, is no greater than $1 \times 10^{-4}$:

—O—$R_5$ (7)

—O—$R_6$ (8)

$R_5$ in formula (7) and $R_6$ in formula (8) have the same definitions as in formula (2);

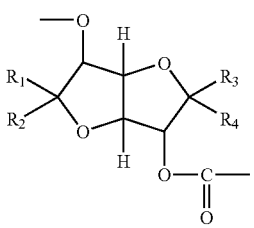
(9)

$R_1$, $R_2$, $R_3$ and $R_4$ in formula (9) have the same definitions as in formula (1).

2. A polycarbonate according to claim 1, characterized in that the mean square radius of gyration is 5 nm or greater.

3. A polycarbonate according to claim 1, wherein the content of Na, Fe and Ca in the polymer is no greater than 10 ppm.

4. A polycarbonate according to claim 1, wherein the Col-b value of the polymer is no greater than 5.

5. A molding comprising a polycarbonate according to claim 1.

6. A molding comprising a polycarbonate according to claim 2.

7. A molding comprising a polycarbonate according to claim 3.

8. A molding comprising a polycarbonate according to claim 4.

* * * * *